United States Patent
Perlman et al.

[15] 3,681,745
[45] Aug. 1, 1972

[54] DETECTION SYSTEM EMPLOYING DIGITAL BANDPASS FILTERING CIRCUITRY

[72] Inventors: David E. Perlman, 59 Stoneham Drive, Rochester, N.Y. 14625; Donald S. Degen, 124 Yarmouth Road, Rochester, N.Y. 14610

[22] Filed: March 19, 1970

[21] Appl. No.: 20,887

[52] U.S. Cl. ................. 340/1 R, 340/3 D, 343/7.7
[51] Int. Cl. ............................................. G01s 9/66
[58] Field of Search..340/1, 3, 3 D, 3 FM; 343/5 DP, 343/5 PD, 7.7

[56] References Cited
UNITED STATES PATENTS
3,394,342  7/1968  Walker ........................... 340/1

Primary Examiner—Richard A. Farley
Attorney—Warren W. Kurz

[57] ABSTRACT

An acoustic detection system of the Doppler variety is provided with digital filtering circuitry for eliminating the false alarming effects of various spurious sources which are situated in or near a space being monitored for a predetermined type of motion. Squaring circuitry is provided for converting the normally analog waveforms to digital waveforms whereby simple digital band-pass filters may be used to sharply discriminate against those frequencies considered non-attributable to the particular motion of interest.

10 Claims, 11 Drawing Figures

AVERAGING CIRCUIT | AUDIO AMPLIFIER | REGENERATIVE SQUARING CIRCUIT

INVENTORS
DAVID E. PERLMAN
DONALD S. DEGEN

BY Warren W. Kurz
AGENT

INVENTORS
DAVID E. PERLMAN
DONALD S. DEGEN

BY *Warren W. Kurz*

AGENT

PATENTED AUG 1 1972 3,681,745

INVENTORS
DAVID E. PERLMAN
DONALD S. DEGEN

BY *Warren W. Kurz*

AGENT

DETECTION SYSTEM EMPLOYING DIGITAL BANDPASS FILTERING CIRCUITRY

BACKGROUND OF THE INVENTION

The present invention relates to motion-responsive systems, such as fire and intruder detection systems, which operate on the well-known Doppler principle. More specifically, this invention relates to improvements in filtering circuitry adapted for use in such systems whereby electrical signals generated by false alarm-producing sources may be distinguished from those generated by the occurrence of a predetermined type of motion, and thereby be prevented from producing a false alarming of the system.

In acoustic or ultrasonic detection systems of the Doppler variety, such as disclosed in U.S. Pat. No. 2,794,974 to S. M. Bagno et al., it is common to subject the output signal of the Doppler frequency detection component (i.e., the mixing circuit) to bandpass filtering before transmitting it to the alarm activating component so as to sound an alarm. Such filtering serves to prevent certain undesirable frequency components (i.e., those frequencies which are considered either too high or too low to be considered attributable to the specific motion of interest) from reaching the alarm component and thereby generating false alarms. In conventional systems, such filtering is accomplished by the use of RC networks. While extremely sharp bandpass filtering may be accomplished by cascading stage after stage of RC filtering networks, such filtering requires the use of a multitude of circuit elements and thus tends to be costly. Moreover, RC filtering networks may be subject to undesirable "ringing" and may not attenuate sufficiently outside of the pass band to block very large spurious signals.

SUMMARY OF THE INVENTION

Accordingly, it is the primary object of the present invention to provide an improved Doppler detection system comprising extremely sharp bandpass filtering circuitry which suffers none of the aforementioned disadvantages of RC filtering circuitry. In accordance with a preferred embodiment, this objective is accomplished by the provision of a detection system which includes a motion detecting component that is capable of generating a digital signal comprising a train of equal amplitude rectangular pulses, each pulse having a width proportional to the average rate of motion of objects within the space monitored by the system at the time the pulse is generated, and digital filtering circuitry whereby pulses having pulse widths and frequency of occurrence below a predetermined minimum value may be filtered out of the output of the motion detecting component. Means are provided for integrating the signal transmitted by the filtering circuitry and for providing an alarm activating signal when the integrated signal strength exceeds a predetermined threshold within a predetermined time. The digital filtering circuitry has the advantage over RC circuitry of being able to provide superior filtering quality with much fewer electrical components. Moreover, such circuitry is not subject to ringing oscillation. Other objects and advantages will become apparent to those skilled in the art upon reading the detailed description of a preferred embodiment provided below.

BRIEF DESCRIPTION OF THE DRAWINGS

In the detailed description of the preferred embodiment of the invention presented below, reference is made to the accompanying drawings, in which:

FIG. 2 is a schematic circuit diagram illustrating a preferred circuit of a logical NOR gate for comparing the phase of two waves;

FIG. 3 depicts a truth table for the NOR gate illustrated in FIG. 2;

FIG. 4 shows the manner in which the circuit illustrated in FIG. 2 responds to various inputs;

DETAILED DESCRIPTION OF THE PREFERRED EMBODIMENTS

Figure 1:
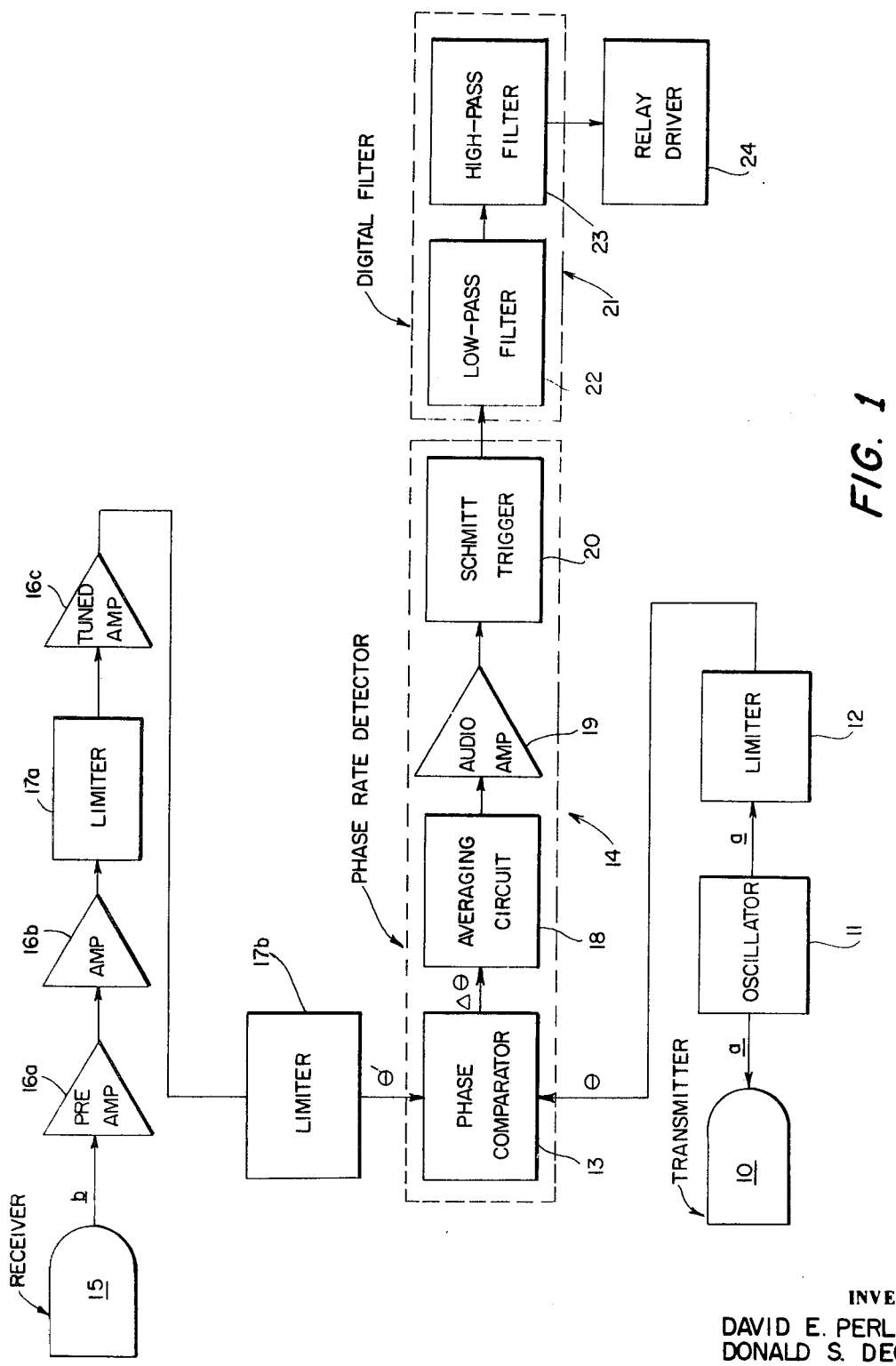
FIG. 1 represents, in block diagram form, an acoustic detection system embodying the present invention.

Referring now to FIG. 1, an ultrasonic detection system embodying the invention is shown in block diagram form. While the system shown operates on the well-known Doppler principle, it is of a non-conventional variety in that it relies on circuitry for sensing changes in phase between the transmitted and received acoustic waves which the intruder produces by his movements in the protected area, rather than circuitry for sensing changes in frequency. It will become apparent, however, from the ensuing description that the invention has equal utility in the more conventional frequency sensing system.

A continuous acoustic wave, preferably ultrasonic and having a frequency of approximately 40,000 cycles/second, is transmitted into the area to be protected from intrusion by a conventional electro-acoustical transducer 10. Transducer 10 is driven by the output $a$ of an oscillator 11 of standard design. The identical signal which drives the transducer 10 is also fed to a standard limiting circuit 12 which serves to convert the sinusoidal output of the oscillator to a square wave. The square wave output $\theta$ of limiter 12 is then fed directly to one of the two inputs of phase comparator 13, forming a part of a phase rate detector 14. Both phase comparator 13 and rate detector 14 are described in detail hereinafter.

Upon being reflected by objects in the protected area the ultrasonic wave is received by a receiving element 15, such as a crystal microphone which reconverts the acoustic energy to electrical energy. According to the Doppler effect, the received wave will be a sinusoidal waveform having a frequency dependent upon the rate of change in position of any of the objects in the protected area. When there is no motion in this area, the frequency of the received wave, of course, is identical with that of the transmitted wave. The normally low-level sinusoidal output $b$ of receiver 15 is then amplified and limited by a series of amplifiers 16a, 16b and 16c and limiters 17a and 17b, all being of conventional design. Amplifier 16c is fairly sharply tuned so as to exclude unwanted ultrasonic frequencies from noise sources such as hammering radiators and to obtain an increased phase shift due to frequency changes arising from moving targets; i.e., the Doppler effect. The purpose of the limiting circuits is to permit phase comparison that is independent of amplitude. The relatively high level square wave output $\theta'$ of the final limiting stage 17b is then fed to the remaining input to the phase comparator 13.

Phase comparator 13 is of the digital type which is capable of providing at its output, $\Delta\theta$, a train of pules, each having a fixed amplitude and a pulse width proportional to the instantaneous phase difference between the transmitted and received waves; i.e., the difference in phase between the two square wave inputs as provided by limiters 12 and 17b. The frequency of the pulses constituting output $\Delta\theta$ is, of course, determined by the frequency of the reference input signal $\theta$ which, in turn, is governed by the output frequency of oscillator 11. Thus, the frequency of $\Delta\theta$ is ultrasonic (e.g., 40,000 cycles/sec.).

The output $\Delta\theta$ of phase comparator 13 is then passed through an averaging circuit 18 which serves to convert this digital output to a fluctuating voltage (analog signal) having a frequency equal to the instantaneous rate of change of phase. Since the rate of phase change is proportional to the Doppler frequency shift of the received ultrasonic wave, and since this frequency shift is proportional to the nature of the motion in the protected area, the output of averaging circuit 18 will be characteristic of the nature of the motion of the protected area. By filtering this output in the manner hereinafter described, the false-alarming effects of many spurious sources may be avoided.

To subject the output of the averaging circuit to the digital filtering techniques of the instant invention, it is first necessary to convert the analog output of averaging circuit 18 to a digital waveform. To accomplish this conversion, the averaging circuit output is first fed through a standard audio amplifier 19 which serves to increase signal level.

Bandpass RC filtering of conventional design is utilized in the audio amplifier to prevent small target-related signals from being masked by large disturbances having frequencies outside of the pass band. The output of amplifier 19 is then fed to a regenerative squaring circuit 20, preferably of the well known Schmitt trigger variety. The Schmitt trigger, provides a train of pulses of fixed amplitude and of a width equal to the time during which its input (the audio amplifier output) exceeds the triggering threshold of the trigger circuit.

The output of the Schmitt trigger 20, being a digital waveform, is capable of being digitally filtered and is fed to the input of digital filter 21. Undesirable high frequencies, generated primarily by ultrasonic and electrical transients, are filtered out by a low-pass filter 22 which functions by rejecting all pulses having a pulse width less than a predetermined value. Thus, lowpass filtering is reduced to a simple pulse width discrimination.

The output of low-pass filter 22 serves as the input to high-pass filter 23 which responds to the average number of pulses transmitted per unit time by the low-pass filter. Filter 23 will only provide an output if the number of pulses within a given time interval exceeds a pre-set minimum. Thus, high-pass filtering is reduced to a simple counting operation. Whenever the pulse input to digital filter 21 has a repetition within the bandpass of the digital filter, then an output will be transmitted to the relay driver circuit 24, thereby actuating an alarm.

In FIG. 2, a preferred circuit for accomplishing the aforedescribed function of the phase comparator is shown schematically. The circuit is energized by voltage source $v$. The square wave outputs $\theta$ and $\theta'$ of limiters 12 and 17 are applied to the bases of transistor Q1 and Q2, respectively. When either base is positive, the voltage at the common collector point will be low, since Q1 and Q2 by themselves are capable of conducting current through resistor R3. The output will only be high (at supply voltage) when Q1 and Q2 are both off, a condition occurring when their respective bases are at a low potential. The circuit of FIG. 2 is essentially a logical NOR gate having a truth table as shown in FIG. 3. Diodes D1 and D2 serve as a means for providing a discharge path for coupling capacitors C1 and C2, respectively. Resistors R1 and R2 serve to limit the current into the bases of Q1 and Q2 and prevent the low impedance of the transistors from loading other circuits in the system. While a NOR gate is preferred, it should be apparent that any other logical gate (e.g., AND, OR or NAND) could be used, so long as the output thereof is characteristic of the phase difference between the transmitted and received pulses.

FIG. 4 depicts the output $\Delta\theta$ of the phase comparator 13 for hypothetical inputs $\theta$ and $\theta'$ which, of course, are squared versions of the sinusoidal outputs $a$ and $b$ of the transmitter and receiver elements, respectively. Note, the closer $\theta$ and $\theta'$ come to being in phase, the wider the pulse width of $\Delta\theta$ becomes, with the maximum pulse width being equal to half the period of oscillation of the transmitted wave. Conversely, the further $\theta$ and $\theta'$ go out of phase, the narrower the pulse width of $\Delta\theta$ becomes, with the minimum pulse width being equal to zero.

Figure 5:
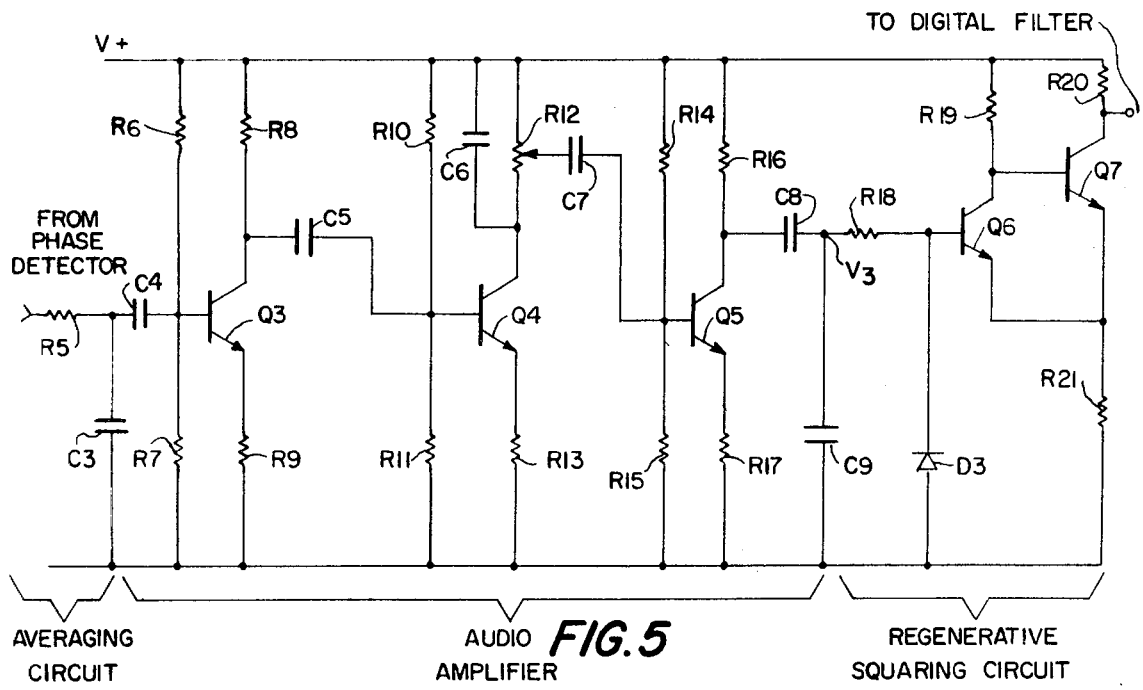
FIG. 5 is a schematic circuit diagram showing preferred circuitry for the averaging, audio amplifying the regenerative squaring circuits comprising the system shown in FIG. 1.

The output $\Delta\theta$ of phase comparator 13 is then fed to the input of the circuit schematically illustrated in FIG. 5. This circuit includes the averaging circuit 18, audio amplifier 19 and the Schmitt trigger 20, all of which, as previously mentioned being of conventional design. The averaging circuit, comprising resistor R5 and capacitor C3, serves to average its input, $\Delta\theta$ so as to provide a fluctuating analog signal when the pulse widths of $\Delta**$ are fluctuating. As aforementioned, the instantaneous frequency of the output of the averaging circuit is proportional to the rate of phase change.

The averaging circuit output is coupled to a conventional audio amplifier 19 via capacitor C4. This amplifier consists of transistors Q3, Q4 and Q5 and their associated bias resistors R6 through R17. The amplifier is AC coupled so as to remove very low frequency components, such as those produced by air turbulence or the like, which might otherwise overdrive the squaring circuitry that follows and thereby paralyze the detector for unacceptably long periods of time. The coupling capacitors C4, C5, C7 and C8 are pre-filters for the sharp digital filtering which follows. Shunt capacitors C6 and C9 help to remove unwanted high frequencies which are completely eliminated in the following digital filter. Sensitivity is controlled by the adjustable resistor R12.

Figure 6A:
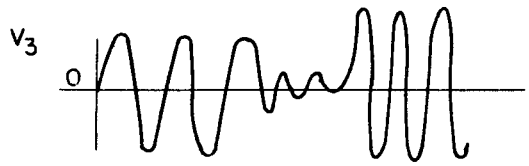
FIG. 6 illustrates the signal waveform at various points in the circuit depicted in FIG. 5.
Figure 6B:
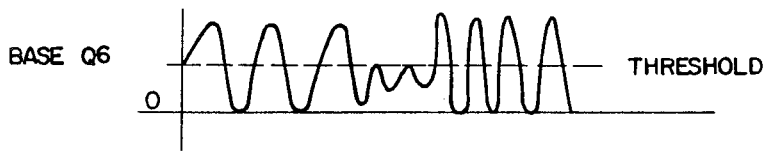
Figure 6C:
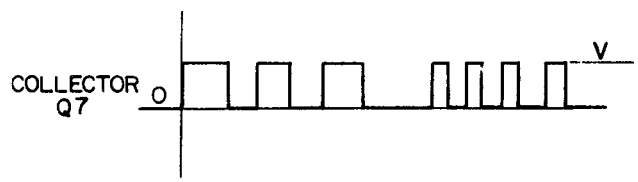
Figure 5:
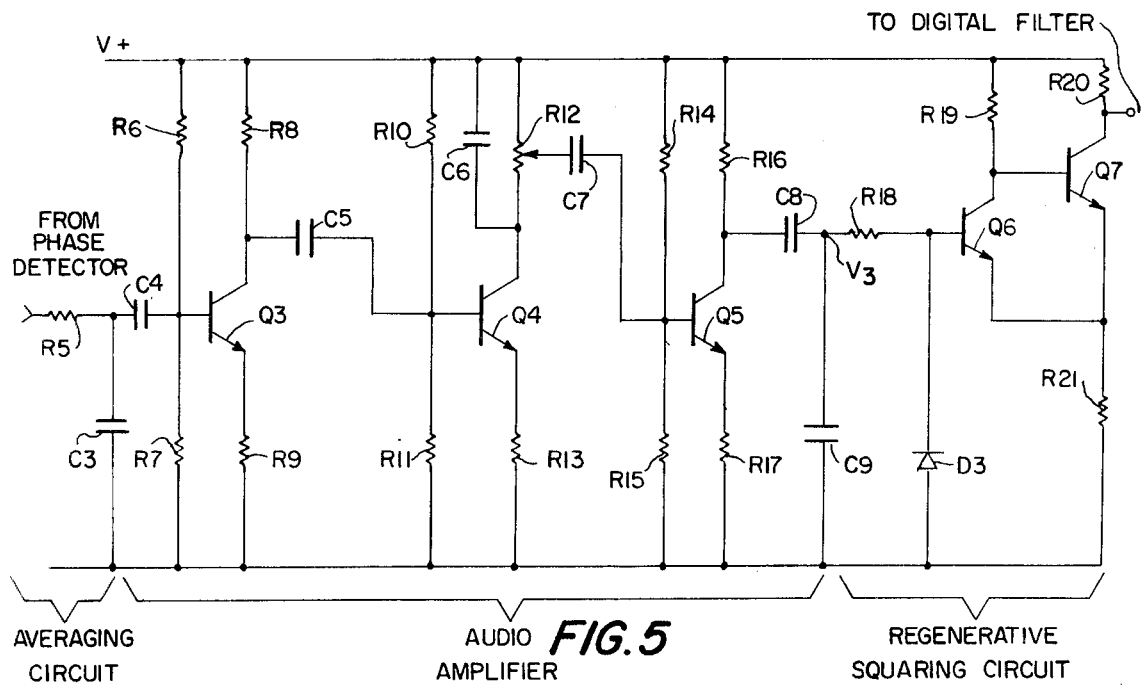
Figure 6A:
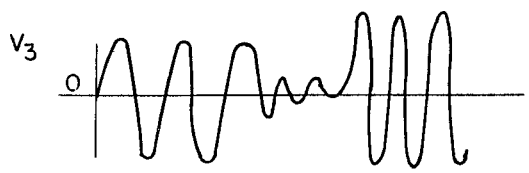
Figure 6B:
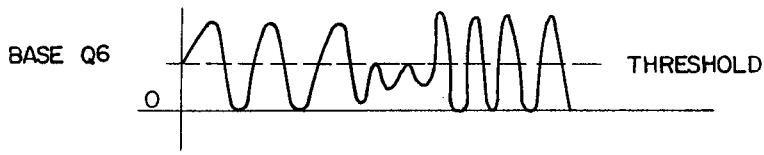
Figure 6C:
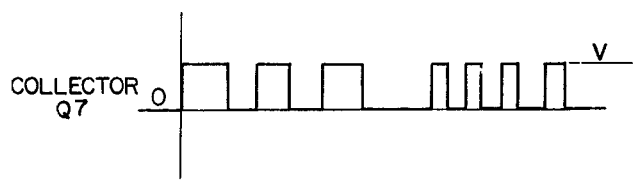

The output of the audio amplifier, shown in FIG. 6a, is referenced to ground by the combined action of capacitor C8 and diode D3 and this waveform is squared in the regenerative squaring circuit which comprises transistors Q6 and Q7 and their associated biasing resistors R18 through R21. The squaring circuit, here a Schmitt trigger, functions by switching transistor Q7 from saturation to near cut-off whenever the input at the base of Q6 exceeds the voltage drop across resistor R21. This voltage drop, constituting a noise rejection level, is determined by the ratio of the values of R21 to R20. The output of the audio amplifier at point $V_3$ and the input to the output of the Schmitt trigger are shown in FIGS. 6A–6C, respectively.

Figure 7:
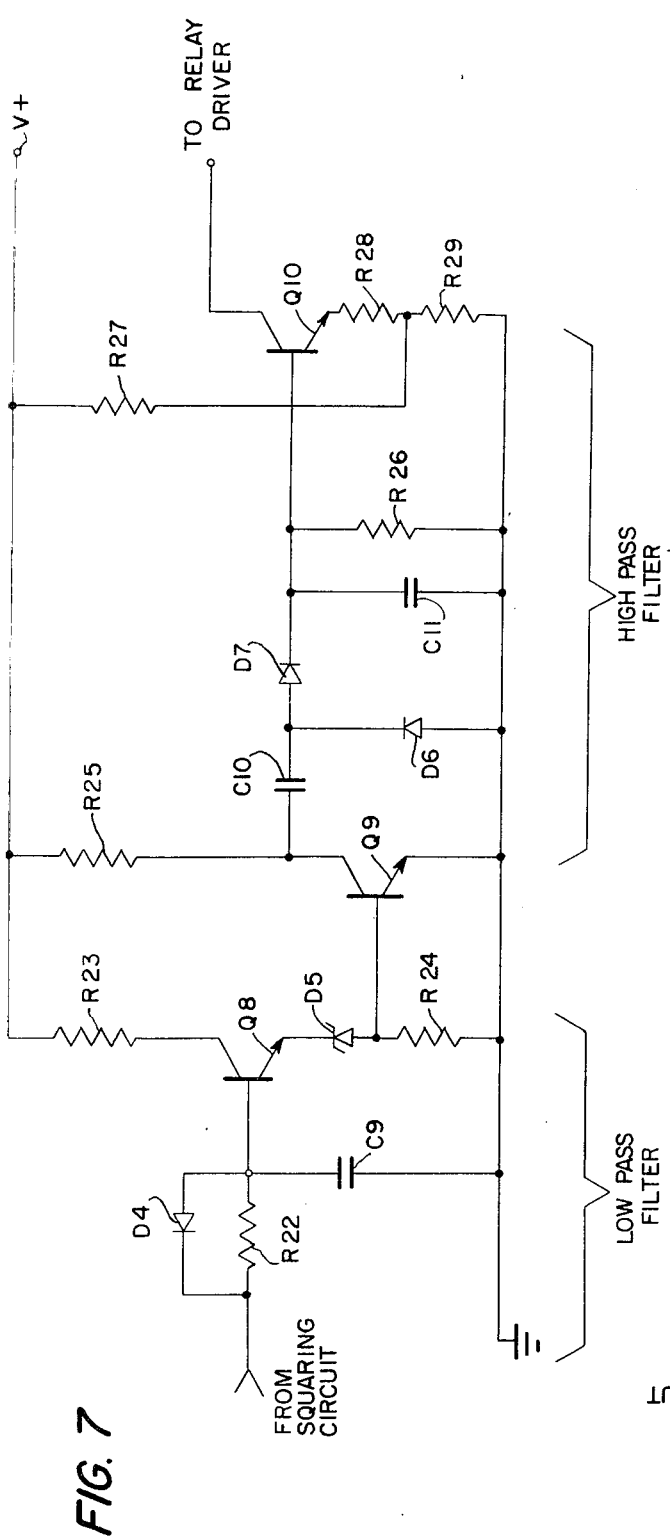
FIG. 7 is a schematic circuit diagram showing a preferred form of the digital filtering circuit comprising the invention.
Figure 8:
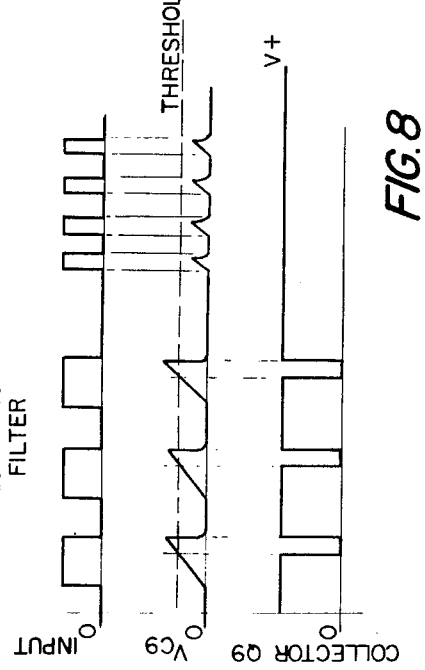

The output of the Schmitt trigger is then processed by the digital filtering circuitry illustrated in FIG. 7. A low-pass filter, comprising capacitor C9, resistor R22 and diode D4, serves to reject all pulses shorter than a predetermined value. Transistor Q8 and zener diode D5 provide the threshold action for this filter. The filter is driven from the squaring circuit which acts as a low impedance switch which impresses rectangular pulses at the input to resistor R22. Upon receipt of a pulse, capacitor C9 begins to charge through R22 and the voltage across C9 rises exponentially, as shown in FIG. 8. The voltage waveform across C9, indicated as $V_{C9}$ in FIG. 8, is shown with a linear increase because it is near the start of the exponential charge which is cut-off long before completion. As soon as the input pulse returns to zero, capacitor C9 discharges through diode D4. Thus, it is seen that for positive voltages at the input, the digital filter acts as a simple RC integrator with a time constant equal to R22 C9. The rapid discharge provided by D4, resets the integrator following each pulse. Referring to FIG. 8, it is apparent that narrow pulses from the squaring circuit result in smaller peak voltages across C9 than do wide pulses. If a pulse is wide enough to be passed, the voltage across C9 will exceed the threshold established by zener diode D5, and transistor Q8 will conduct, thereby, switching transistor Q9 from cut-off saturation. Thus, only those pulses which are wider than a certain minimum value will be transmitted to the following high-pass filter. This type of circuit is capable of rejecting two frequencies which differ by only a few cycles per second out of many hundreds of cycles per second. Thus, it may be appreciated that extremely sharp low-pass filtering is provided.

Figure 9:
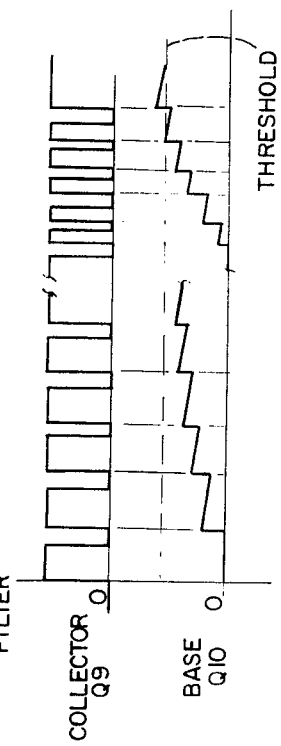
FIGS. 8 and 9 illustrate possible signal waveforms at various points in the digital filtering circuit depicted in FIG. 7.

Those pulses transmitted by the aforedescribed low-pass filter are then fed to the high-pass filter input; i.e., the collector of Q9. The high-pass filter essentially comprises a staircase counter of standard design. As shown in FIG. 7, it is comprised of capacitors C10 and C11 and diodes D6 and D7. Capacitor C11 is much larger than C10. Each time the voltage at the input to C10 increases, a small amount of charge is transmitted through C10 into C11. When the input pulse drops to zero volts, C10 discharges through diode D6 leaving the accumulated charge on C11 isolated from the input by diode D7 which is cut-off. Thus, each pulse received causes the voltage across C11 to accumulate in steps. If resistor R26 and transistor Q10 were absent, the charge on C11 would not decay and the voltage across C11 would increase in steps until the total voltage reached approximately the input pulse magnitude. Because of the load resistor R26, however, C11 discharges between pulses. Therefore, if the pulses received are spaced far enough apart so that the voltage across C11 decays by an amount equal to the step increment generated by each pulse, then no voltage accumulation will occur. If the pulse spacing is greater, then the voltage across C11 will decay and if the pulse spacing is smaller, then the voltage across C11 will increase. (See FIG. 9). Resistors R27 and R29 form a voltage divider which sets a threshold point for the conduction of transistor Q10. Resistor R28 is necessary to provide a very high input impedance so that R26 is not loaded. If the pulse spacing is sufficiently close and enough pulses are received, then Q10 will conduct and trigger the relay driver circuit to transmit an alarm. Note that the high-pass filter requires not only a pulse spacing smaller than a predetermined amount, but also a minimum number of pulses. The circuit's operation is weighted in favor of the high frequencies as it takes more low frequency pulses than high frequency pulses to trigger Q10. This operation is equivalent to a weighted integration which favors those frequencies located somewhat above the cut-off point.

From the foregoing, it is apparent that the high-pass filter performs a longer integration for those frequencies located near the lower edge of the bandpass and also for bursts of high frequencies with relatively large spacing. This characteristic is advantageous in that it improves the ability of the circuit to reject disturbances due to loud noises and metallic impacts as might be caused by a dropped metal plate. These noises are characterized by bursts of frequencies within the bandpass separated by relatively long dead spots whereas a target looks far more continuous.

While the invention has been disclosed with particular reference to a phase-comparing Doppler system, it should be apparent that the invention has equal utility in the more conventional frequency-comparing system. To employ the invention in systems of the latter type, the Doppler frequency (i.e., the output of the mixer component) is amplified and fed directly into a squaring circuit, such as the Schmitt trigger circuit shown in FIG. 5, and thereafter processed in the same manner as disclosed above.

We claim:

1. A detection system for detecting motion of a particular character in a predetermined space, said system comprising:

a continuous wave transmitter for sending a wave of energy of predetermined frequency through the space wherein motion is to be detected;

a receiver arranged to receive said wave of energy as modified by the motion of objects within said space;

a phase rate detector, operably coupled with said transmitter and receiver, for comparing the instantaneous phase of the received wave with that of the transmitted wave and for providing a digital output signal comprising a train of pulses having pulse widths proportional to the rate at which the phase of said received wave changes with respect to said transmitted wave; and digital filtering means, operably connected with said phase rate detector output, for filtering out pulse widths uncharacteristic of the particular motion to be detected.

2. A detection system according to claim 1 wherein said digital filtering means comprises high and low-pass filters connected in series.

3. A detection system according to claim 2 wherein said low-pass filter is fed by said phase rate detector output and comprises means for transmitting only those pulses having a width greater than a predetermined value, and said high-pass filter is fed by pulses transmitted by said low-pass filter and comprises means for counting the number of pulses transmitted by said low-pass filter and for providing an output signal by which an alarm may be activated when said counting means counts more than a predetermined number of pulses within a predetermined time interval.

4. A detection system according to claim 1 wherein said phase rate detector comprises:

means, operably coupled with said transmitter and receiver, for comparing the instantaneous phase of said received and said transmitted wave and for providing a digital output signal comprising a train of pulses, each of said pulses having a pulse width proportional to the instantaneous difference in phase between said transmitted and received waves;

means for averaging said digital output of said phase comparing means so as to obtain an analog signal having a frequency substantially equal to the rate at which the phase of said received wave changes with respect to that of said transmitted wave; and means for converting said analog signal to a digital waveform comprising a train of pulses, each pulse of which has a pulse width proportional to the rate of change in phase.

5. The detection system according to claim 4 wherein said analog to digital converting means comprises a regenerative squaring circuit of the Schmitt trigger variety.

6. A detection system for detecting motion of a predetermined character in a predetermined space said system comprising:

means for transmitting a continuous wave of energy of predetermined frequency through the space wherein motion is to be detected;

means for receiving said energy wave as modified by the motion of objects within said space;

a phase rate detector, operably coupled with said transmitting and receiving means for comparing the instantaneous phase of the received wave with that of the transmitted wave and for providing a digital output signal comprising a train of substantially rectangular pulses having a repetition rate corresponding to the rate at which the phase of the received wave changes with respect to the transmitted wave, said phase rate detector comprising gate means, operably coupled with the outputs of said transmitting and receiving means, for transmitting pulses having pulse widths proportional to the instantaneous difference in phase between said transmitted and received waves, means for averaging the output of said gate means so as to provide an analog waveform having a frequency proportional to the rate at which the phase of said received wave varies with respect to said transmitted wave, and means for squaring said analog waveform so as to provide said digital output signal; and digital filtering means, operably connected with said phase rate detector output, for filtering out pulse widths uncharacteristic of the particular motion to be detected.

7. A Doppler detection system for detecting motion of a particular character occurring in a predefined space, said system comprising:

means for transmitting a continuous wave of energy of predefined frequency into said predefined space;

transducing means arranged to receive said wave of energy upon being reflected and/or modified by objects within said predefined space, said transducing means being adapted to provide a first electrical signal having a frequency proportional to the frequency of the received wave of energy;

means for providing a second electrical signal having a frequency proportional to the frequency of said transmitted wave of energy;

means for comparing said first and second electrical signals to provide an analog signal of the Doppler frequency;

means, operatively coupled with said analog signal, for providing a digital output signal comprising a train of pulses, each pulse having a pulse-width proportional to the instantaneous Doppler frequency; and digital filtering means for transmitting only those pulses in said train of pulses having pulse widths within a predefined range of pulse widths.

8. The invention according to claim 7 wherein said wave of energy is acoustic in nature and said predefined frequency is ultrasonic.

9. The invention according to claim 7 wherein said digital filter comprises low-pass filtering means for transmitting only those pulses having a pulse width greater than a predefined value and means operatively coupled to said low-pass filtering means for counting the number of pulses transmitted by said low-pass filtering means and for providing an output signal, whereby an alarm can be activated, when said counting means counts more than a predetermined number of pulses within a predefined time interval.

10. The invention according to claim 7 wherein said squaring means comprises a Schmitt-type trigger.

* * * * *